US010209397B2

(12) United States Patent
Mayilo et al.

(10) Patent No.: US 10,209,397 B2
(45) Date of Patent: Feb. 19, 2019

(54) DEVICE AND METHOD FOR DETECTING OBJECTS IN A MONITORING FIELD

(71) Applicant: ELESTA GMBH, Bad Ragaz (CH)

(72) Inventors: Sergiy Mayilo, Sargans (CH); Dominik Guldimann, Bonaduz (CH)

(73) Assignee: ELESTA GMBH (CH)

( * ) Notice: Subject to any disclaimer, the term of this patent is extended or adjusted under 35 U.S.C. 154(b) by 73 days.

(21) Appl. No.: 14/641,999

(22) Filed: Mar. 9, 2015

(65) Prior Publication Data

US 2015/0253457 A1    Sep. 10, 2015

(30) Foreign Application Priority Data

Mar. 7, 2014 (CH) .................................... 0337/14

(51) Int. Cl.
*G01V 8/14* (2006.01)
*G01S 7/481* (2006.01)
*G01S 17/02* (2006.01)

(52) U.S. Cl.
CPC .............. *G01V 8/14* (2013.01); *G01S 7/4813* (2013.01); *G01S 7/4814* (2013.01); *G01S 7/4815* (2013.01); *G01S 17/026* (2013.01)

(58) Field of Classification Search
CPC ....... G01V 8/14; G01S 7/4813; G01S 7/4814; G01S 17/026
See application file for complete search history.

(56) References Cited

U.S. PATENT DOCUMENTS

| 6,455,834 B2* | 9/2002 | Fujimoto | H04N 1/0312 |
| | | | 250/208.1 |
| 7,338,193 B1* | 3/2008 | Zeiger | G02B 6/0001 |
| | | | 362/551 |
| 7,717,598 B2* | 5/2010 | Kakizaki | G02B 6/0018 |
| | | | 250/227.11 |
| 2005/0162853 A1 | 7/2005 | Jain | |
| 2015/0177366 A1* | 6/2015 | Halbritter | H01L 31/173 |
| | | | 250/216 |

FOREIGN PATENT DOCUMENTS

DE    10308085 A1    10/2003
EP    2157449 A1    2/2010

* cited by examiner

*Primary Examiner* — Tony Ko
(74) *Attorney, Agent, or Firm* — Morriss O'Bryant; Compagni Cannon PLLC (57) ABSTRACT

A device for detecting objects in a monitoring range is described, comprising a sensor and an emitter, wherein the emitter includes the following components: a housing, a radiation source for emission of electromagnetic rays and a radiation-conducting device, which is designed to conduct the rays on their path from the radiation source to the point of exit from the emitter, wherein the radiation-conducting device has a focusing element for focusing the rays. The radiation-conducting device is designed to deflect the rays on their path from the radiation source to the point of exit from the emitter by two reflections.

29 Claims, 5 Drawing Sheets

DEVICE AND METHOD FOR DETECTING OBJECTS IN A MONITORING FIELD

CROSS REFERENCE TO RELATED APPLICATIONS

This application claims priority to Swiss Patent Application No. 00337/14 filed Mar. 7, 2014, the entirety of which is incorporated by this reference.

TECHNICAL FIELD

The invention relates a device, in particular a photoelectric barrier or a light sensor, and a method for detecting objects in a monitored area.

PRIOR ART

Devices for detecting objects that operate with electromagnetic radiation, such as light or infrared radiation, can be used in a variety of ways. Light sensors and photoelectric barriers, which also include light grids and light curtains as design variants, are common application forms that are also of special interest in conjunction with the present invention.

Such devices generally have one or more emitters of electromagnetic radiation as well as one or more sensors for detecting the rays. An emitter operates with one or more sensors for generating an electric signal as a function of the presence of an object in the monitored area of the device. The change (caused by an object in the monitored area of the device) in the intensity of the radiation emitted by the emitter is recorded by means of the sensor and converted to a signal, which is normally an electric signal. The signal may then be processed further by a microprocessor, for example. Furthermore, there is the possibility that additional processes may be controlled, depending on this signal, such as the operating status of a device, in particular a machine, for example.

The present invention may also have one or more of the properties and functions described previously.

Figure 9:
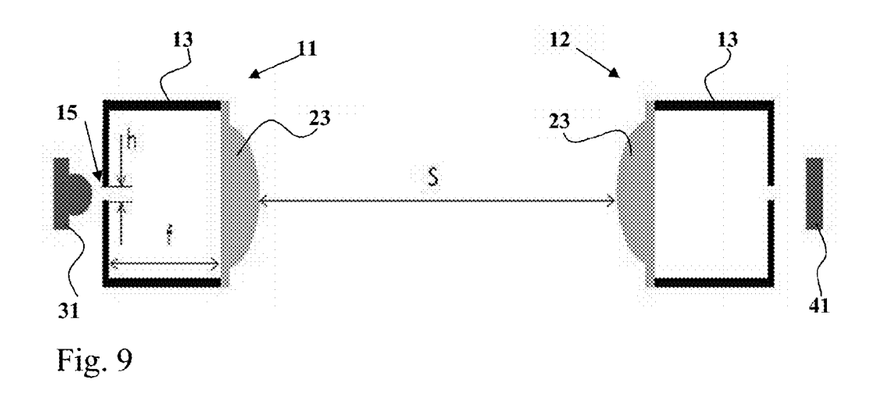

A design of an emitter that was previously customary (cf. FIG. 9) includes a tubular housing, a radiation source for emission of electromagnetic rays and a lens as the focusing element. An aperture having an opening width (h) is arranged between the radiation source and the lens, and a cavity of the length (f) is located between the aperture and the lens. The sensor is positioned at a distance (S) from the emitter, such that the radiation intensity at the sensor and thus the range of the device naturally depend on the opening width (h) of the aperture. The area irradiated by the emitter at the location of the sensor is kept limited and constant in general for the alignability of the system and because of standard requirements. Therefore, if the aperture opening width (h) is increased, the lens and the length (f) of the cavity must also be adjusted, i.e., increased, in order for the irradiated area at the location of the receiver to remain constant. Consequently, to achieve a greater range, a lens having a larger focal distance must be used with the emitter. However, this increase in the structural size of the emitter is not desirable for many applications. FIG. 9 illustrates the relationships described above.

EP 2157449A1 describes a device for detecting objects in a monitored area in which folding and/or deflection of the rays is provided, but a different goal is being pursued there in comparison with the present invention. The known device has an emitter and a sensor, each having a housing, a lens and a radiation source (with the emitter) and/or a receiver (with the sensor). A radiation-conducting arrangement in the form of a prism is provided between the lens and the radiation source and/or the receiver. The prism deflects the rays between the lens and the radiation source and/or the receiver by total reflection by approx. 90°. The prism acts as a filter, achieving the result that less scattered light is emitted and/or received because scattered light striking the area of the prism provided for total reflection at an angle smaller than the limit angle of the total reflection is not reflected.

DE 10308085A1 discloses an optoelectronic device for detecting objects in a monitored area. With this device, a single deflection of the received rays of light parallel to the front panel of the sensor is provided. However, the miniaturization effect is limited.

A Patent Office search has revealed US 2005/0162853 A1 as a further prior art document. However, this document does not relate to a device for detecting objects in a monitored area, such as a light grids, for example, but instead relates to lighting systems of projectors and the like, which is a different technical field with different goals. According to this prior art, the goal is to impart the greatest possible spatial uniformity to the light rays by mixing the rays strongly, which necessitates multiple reflections. In addition, another goal is to increase the luminous efficiency by light recycling. In contrast with that, no mixing of rays is desired with devices for detecting objects in a monitored area, such as light grids, but instead the rays should be conducted without mixing as much as possible, as if they were moving through free space.

Advantages of the Invention

One advantage of the present invention is to provide a device and a method for detecting objects in a monitored area. The device should be smaller than comparable known devices of this type having the same range and/or should have an increased range at the same size. Additional advantages and goals of the present invention are derived from the following description.

SUMMARY OF THE INVENTION

The advantages set forth above are achieved by a device according to the claims of the present invention.

A device for detecting objects in a monitored area, comprising a sensor and an emitter, is disclosed, wherein the emitter includes the following components:
 an optional housing,
 a radiation source, for emitting electromagnetic rays,
 a radiation-conducting arrangement, which is designed to conduct and/or deflect the rays on their path from the radiation source to the point of exit from the emitter, wherein the radiation-conducting arrangement has a focusing element for focusing, and
 wherein the radiation-conducting arrangement is designed to deflect the rays on their path from the radiation source to the point of exit (of the rays) out of the emitter by reflecting them two or more times.

In addition, a method for detecting objects in a monitored area by using such a device is disclosed.

Features of the device and the method are described below, wherein these are to be considered (individually) as desired features even if they are not identified as such. These features may be implemented separately (as part of any device or any method for detecting objects in a monitored area) or in any combination, as long as they are not mutually preclusive.

The device may be an optical device, in particular an optoelectronic device.

It is desirable if the path of the rays from the radiation source to the point of exit from the emitter, this path being defined by the radiation-conducting arrangement, is longer by at least 10%, 20%, 30%, 50% or 100% than the shortest distance between the radiation source and the point of exit (of the rays) from the emitter.

According to one embodiment variant, the part of the path of the rays from the radiation source defined by the radiation-conducting arrangement to the point of exit from the emitter (or at least a section thereof), said part of the path being defined by the radiation-conducting arrangement, is designed to be essentially U-shaped or V-shaped. This section may be the section of the path just described on which the rays are deflected by being reflected twice.

In addition, it is possible to provide that the part of the path of the rays from the radiation source to the point of exit from the emitter (or at least a section thereof), said part being defined by the radiation-conducting arrangement, is designed to be essentially helical or spiral or worm-shaped or S-shaped.

According to another embodiment, the radiation-conducting arrangement is designed to deflect the rays on their path from the radiation source to the point of exit from the emitter 2, 3, 4 or more times, in particular to reflect them and/or to conduct them in different directions.

The radiation-conducting arrangement may be designed in particular to deflect the rays on their path from the radiation source to the point of exit (of the rays) from the emitter in addition to the two (possibly successive) reflections through 1, 2, 3 or more additional (possibly successive) reflections, as described above.

The two reflections mentioned above and/or the additional reflections mentioned above may be total reflections or reflections on reflecting or mirrored surfaces. The surfaces may be coated.

The radiation-conducting arrangement may have 1, 2, 3, 4 or more radiation-conducting elements. The radiation-conducting elements may be designed to conduct and/or deflect the rays. These may optionally be reflective surfaces, for example, the reflecting or mirrored surfaces described above or those that produce a total reflection. In particular the radiation-conducting elements (or some of them) may be designed to deflect the rays through the two reflections described and/or through the additional reflections described here.

It may be advantageous if a radiation-conducting element (for example, the/a focusing element) is manufactured from a different material or a different material combination than 1, 2, 3, 4 or more of the other radiation-conducting elements.

It may also be advantageous if the emitter has a radiation-conducting element, which reflects some of the rays striking this radiation-conducting element (e.g., up to at least 20% or 40% and/or at most 80% or 60%) and allows the rest to pass through. Two, three or more such radiation-conducting elements may also be provided with the emitter.

In addition, it is possible to provide for 2, 3, 4 or more of the radiation-conducting elements to have an increasing size in the order in which the rays strike them or pass through them on their path from the radiation source to the point of exit from the emitter. In particular when the radiation-conducting elements (or a portion thereof) are reflective surfaces, the surfaces may be of a size that increases in the order described above. Therefore, space can be saved when the rays diverge, starting from the radiation source or from the aperture—if any—and thus claim an increasing amount of space on the path to the point of exit from the emitter. For example, the radiation-conducting elements may be only as large as necessitated by the space required for the rays at this location on the path.

It is particularly advantageous if 1, 2, 3, 4 or more of the radiation-conducting elements are designed in one piece, i.e., jointly as one part (in particular as an injection-molded part).

In addition, 1, 2, 3, 4 or more of the focusing elements may be contained in the one-piece device part described above. Alternatively, however, they may also be separated from the one-piece device part described above. For example, this is the case with an embodiment of the emitter, in which the focusing elements are manufactured from a different material than the other radiation-conducting elements, in particular the reflective radiation-conducting elements.

In one embodiment variant, the entire radiation-conducting arrangement is designed in one piece or it includes at least the part of the radiation-conducting arrangement in the one-piece device part described above, which is designed to deflect the rays on their path from the radiation source to the point of exit from the emitter through the two reflections and/or through the two additional reflections described above.

These measures serve to reduce the manufacturing cost of the device.

The radiation-conducting arrangement may be designed to conduct (and/or deflect) the rays on their path to the point of exit (of the rays) from the emitter in the form of multiple (e.g., 2, 3, 4 or more) separate amounts of radiation and to conduct and/or deflect the individual amounts of radiation separately from one another (completely or at least over some segments) via different radiation-conducting elements (in particular different reflective radiation-conducting elements) to the point of exit from the emitter. The amounts of radiation may originate from the same or different radiation sources.

Alternatively or additionally, the radiation-conducting arrangement may be designed to split the rays on their path from the radiation source to the point of exit from the emitter into the plurality of amounts of radiation (e.g., 2, 3, 4 or more) and to conduct and/or deflect the individual amounts of radiation from the point of splitting to or from the points of splitting (completely or at least in some segments) via different radiation-conducting elements (in particular different reflective radiation-conducting elements) to the point of exit from the emitter. The splitting may take place when the rays originate from the same radiation source, for example.

When the rays diverge on the path from the radiation source to the point of exit from the emitter, it is possible due to this split to use multiple smaller radiation-conducting elements instead of a smaller number of larger elements in comparison with that. For example, a cone of light may be split in half and then claims half the area for reflection instead of the original area. These smaller elements can then be positioned in a more flexible manner.

All the amounts of radiation or at least 1, 2, 3, 4 or more of the average quantities may be combined again on the path from the radiation source to the point of exit from the emitter and conducted and/or deflected from the point of their combining through the same radiation-conducting elements. This may optionally be true of amounts of radiation, which are the result of splitting of rays or for amounts of radiation, which originate from different radiation sources.

The radiation source may be arranged on the same side of the device and/or of the housing as the point of exit from the emitter. Alternatively, the radiation source and the point of exit from the emitter may be arranged on different sides (desirably on opposite sides) of the device and/or of the housing.

It is also possible that 2, 3 or more points of exit (of the rays) from the emitter are provided with the emitter.

In this case the different amounts of radiation (cf. further above in this regard) may be conducted and/or deflected to different points of exit from the emitter.

The points of exit that have been described may optionally be arranged on the same side or on different sides of the emitter and/or of the housing. Such an emitter might emit, for example, rays from different points of exit from the emitter and/or in different directions and/or to different sensors.

The radiation source is a source of electromagnetic radiation, but light or infrared radiation is desired. According to an advantageous embodiment, the radiation source is a light-emitting diode (LED) or a laser diode.

The emitter may have one or more different radiation sources in addition to the radiation source—as already mentioned above—for emission of electromagnetic rays. In this case, the radiation-conducting arrangement may advantageously be designed to also conduct and/or deflect these rays on their path from one or more radiation sources to the point of exit (or to the points of exit) from the emitter.

According to one embodiment, the emitter has 2, 3 or more radiation sources, which may optionally emit in the same or different directions (starting from the device). Alternatively or additionally, they may be arranged on the same side of the device and/or the housing or on different sides of the device and/or the housing.

The emitter and the sensor may be designed as separate units in order to be able to install them, for example, so that they are arranged opposite one another, in particular on opposite sides of a monitored area.

However, it is also possible to combine the emitter and the sensor in one unit. In this case, the emitter and the sensor may optionally utilize the same radiation-conducting arrangement and/or each may have its own radiation-conducting arrangement.

Alternatively or additionally, it is possible to provide that a radiation-conducting element is designed to reflect some rays on their path from the radiation source to the point of exit from the emitter, these rays striking the aforementioned radiation-conducting element, and to allow the remainder to pass through and to partially reflect rays on the opposite path striking the aforementioned radiation-conducting element and allowing the remainder to pass through (cf. also statements above regarding such elements and in the description of the figures). In this variant, the sensor may have a receiver arranged beyond the aforementioned radiation-conducting element for detecting the passing rays, which move on the aforementioned opposite path.

An aperture may be situated between the radiation source and the point of exit from the emitter, wherein the aperture is situated between the radiation source and the radiation-conducting arrangement. The aperture may have an opening width of more than 0.1, 0.3, 0.5 or 1 millimeter and/or less than 10, 5, 4 or 3 millimeters.

There are various options for accomplishing the focusing of the rays. This may be done by the aforementioned focusing element and optionally by 1, 2, 3, 4 or more additional focusing elements (made of glass or polymer, for example). The rays may strike (e.g., be reflected by) the focusing elements, for example, one after the other and/or may pass through them.

If a plurality of focusing elements is provided, they may each accomplish a portion of the total focusing performed by the emitter.

When there are 1, 2, 3, 4 or more of the focusing elements, they may be lenses or curved reflective surfaces, for example. The lens surface or the curved reflective surface may optionally be designed with rotational symmetry or with axial symmetry, with 1, 2, 3, 4 or more axes of symmetry. Alternatively, the lens surface or the curved reflective surface may be a free-form surface.

According to one embodiment variant, two or more different types of focusing elements may be provided with the emitter.

It is also possible in addition to provide that the focusing element or (respectively) one focusing element may be arranged at the point of exit (or at the points of exit) from the emitter.

The device may have a housing, wherein at least the reflective radiation-conducting elements and/or (essentially) the radiation-conducting arrangement may be located inside the housing.

The radiation source and/or the focusing element and/or the aperture may also be arranged in the housing.

The housing and/or the material of which it is made may optionally be essentially opaque for the rays emitted by the radiation source and/or for light.

According to one embodiment, the aperture may be formed by the housing.

The radiation-conducting arrangement is expediently designed to conduct (and/or deflect) the rays on their path from the radiation source to the point of exit from the emitter essentially inside the housing and/or to define such a path of the rays inside the housing.

According to another embodiment, the radiation-conducting arrangement and/or 1, 2, 3, 4 or more of the radiation-conducting elements (in particular the reflected radiation-conducting elements and/or the focusing elements) may be made of polycarbonate or polymethyl methacrylate (PMMA) or glass.

The device and/or the housing may optionally have a front panel such that the focusing element may be positioned between the front panel and the rest of the radiation-conducting arrangement.

In this case the front panel is expediently arranged at the point of exit from the emitter.

According to one embodiment variant, the radiation-conducting arrangement is designed to conduct and/or deflect the rays on their path from the radiation source to the point of exit from the emitter, one after the other in several different directions (for example, 2, 3, 4 or more). Three or more directions are especially desirable, each of the three directions being aligned across (for example, at an angle of at least 10°, 20°, 40° or 60°) the two other directions (of the three directions). Alternatively or additionally, the radiation-conducting arrangement may be designed to conduct and/or deflect the rays on their path from the radiation source to the focusing element in all three dimensions in space. This constitutes an additional measure for lengthening the path of the rays and also allows better utilization of the space in the emitter.

Alternatively or additionally, the radiation-conducting arrangement may be designed to conduct the rays back and forth 1, 2, 3 or more times on their path from the radiation source to the point of exit from the emitter. The path of the rays can also be lengthened and the space in the emitter can be utilized better in this way.

In this document, the device is defined primarily on the basis of the features of an emitter. Unless otherwise indicated, the features described in this document are features of the emitter.

However, a sensor having one or more of the features described in this document in conjunction with the emitter is also disclosed, but instead of the radiation source (or radiation sources), the sensor has one receiver or more receivers for receiving electromagnetic radiation. Since the rays in this case (in comparison with the emitter) take the opposite path (through the sensor), all the directions and paths of the rays disclosed for this case in the reverse and/or opposite direction shall also be disclosed. The "point of exit from the emitter" in this case becomes the "point of entrance into the sensor." The receiver may advantageously be a phototransistor, a light-sensitive resistor or a photodiode.

The device may have such a sensor and/or an emitter, as described in this document, i.e., an emitter having the components described in this document may optionally also be combined with a sensor of a different design or vice versa.

A device for detecting objects in a monitored area is also disclosed. This device has only one sensor, as described above, but has no emitter. In this case, the device may be designed as a passive sensor, for example, without its own radiation source.

The emitter and sensor described here are also disclosed independently of the device.

For better implementability of the facts of the case as described above, a device for detecting objects in a monitored area shall also be disclosed here, said device containing a sensor and an emitter, wherein the sensor includes the following components: A) optionally a housing, B) a receiver for receiving electromagnetic radiation, and C) a radiation-conducting arrangement, which is designed to conduct and/or deflect rays on their path from the point of entrance into the sensor, wherein the radiation-conducting arrangement may have a focusing element for focusing the rays. The device is characterized in that the radiation-conducting arrangement is designed to deflect the rays on their path from the point of entrance into the sensor to the receiver by means of two or more reflections.

Regardless of the type of emitter and sensor provided for the device, one emitter operates with one sensor to generate an electric signal as a function of the presence of an object in the monitored area of the device. The change in intensity of the radiation emitted by the emitter, induced by an object in the monitored area of the device, is recorded by the sensor and converted to an electric signal. The signal can then be processed further by a microprocessor, for example.

In addition, the use of the device described in this document, the use of the emitter described here and of the sensor described here are disclosed, along with a method for detecting objects in a monitored area, this method being performed with the device described in this document and/or having the method steps described in this document.

The terms used in this document should be understood in the same way as those skilled in the art in this field would understand them. If several interpretations are possible in the given context, then each interpretation should be disclosed individually. Alternatively or additionally, for the case when anything remains unclear in particular, the definitions given in this document may be used.

According to one definition, the opening width of the aperture corresponds to the distance of the edge points of the opening that are the farthest apart from one another.

The rays are the rays conducted and/or deflected by the radiation-conducting arrangement on their path A) from the radiation source to the point of exit from the emitter (in the case of the emitter) or B) from the point of entrance into the sensor to the receiver (in the case of the sensor). When speaking of "rays" (plural), i.e., a plurality of rays in this document, what is said is not only being disclosed jointly for the plurality of rays but, alternatively, also for the individual rays from this plurality of rays (individually). In particular when speaking of a "direction," the respective direction of a ray is also disclosed, wherein what is said in this context also applies accordingly to some or all of the plurality of rays (individually).

When the presence of an object (e.g., the radiation source, the focusing element, the radiation-conducting arrangement, the radiation-conducting element, etc., is mentioned in this document, it does not preclude the presence of additional objects of the same type. In other words, when "one" object is mentioned, "at least one" such object and "one or more" such objects are also disclosed. One, two, three or more or even all of the additional objects may optionally have the same features as the one object or subject matter.

Actions which are disclosed in the form of suitabilities, capabilities, properties or functions of the device described in this document (or a part thereof, e.g., sensor or emitter) are also disclosed (independently and in any combination) as method steps of the method, namely as a function of and independently of the corresponding device or the corresponding device part.

The use of features of the devices that have been described or parts of the devices is disclosed as method steps of the method (independently and in any combination).

Conversely, the devices or device parts that have been disclosed may have means which can carry out and/or are designed to carry out one or more of the method steps mentioned in conjunction with the method disclosed here.

Furthermore, the dependent claims are each also disclosed with a reference back to the one of the preceding patent claims.

BRIEF DESCRIPTION OF THE DRAWINGS

They show in schematic diagrams, not drawn to scale.

DETAILED DESCRIPTION OF THE INVENTION

The invention is explained in greater detail below on the basis of the drawings as an example.

Figure 7:
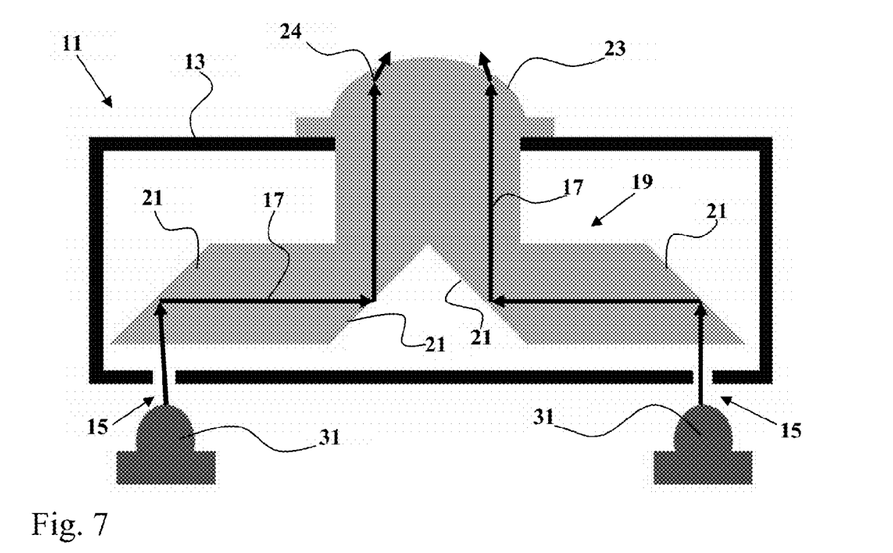
FIG. 7 a side view of the device from a fifth embodiment variant of the device with two radiation sources.
Figure 8:
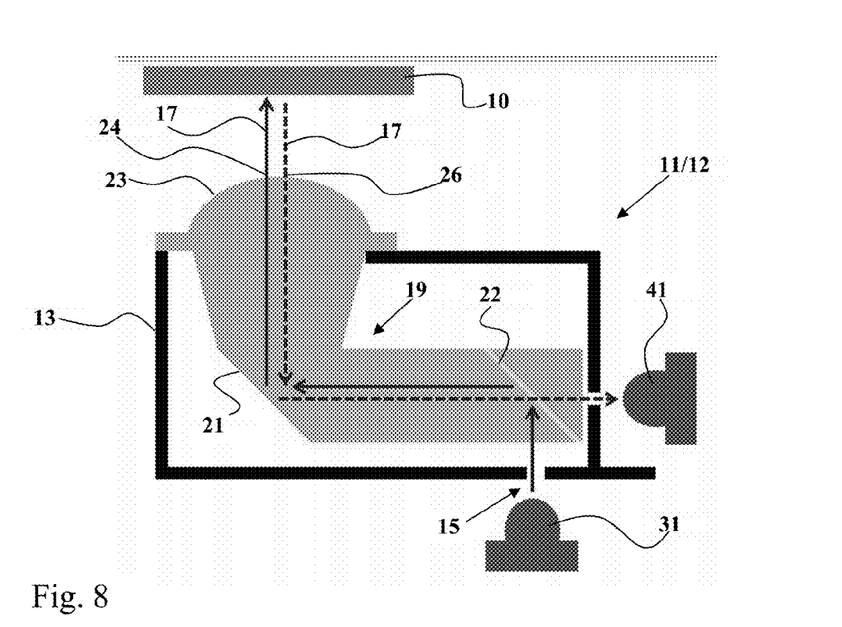
FIG. 8 a side view of a sixth embodiment variant of the device having a radiation source and a receiver, and FIG. 9 a device according to the prior art to illustrate the facts of the case as described in the introduction.

FIGS. 1, 2, 4, 5, 7 and 8 show six different embodiment variants of a device for detecting objects in a monitored area, wherein only one emitter 11 is shown, except for FIG. 8. A complete device would expediently also have a sensor for detecting the rays 17 emitted by the emitter 11.

Such a sensor could also be designed in the manner known from the prior art or could also, in principle, have the same design as the emitter 11, which is described in this document, wherein a receiver (in the case of the sensor, which is not shown) for the electromagnetic rays 17 would be provided instead of the radiation source 31 (in the case of the emitter 11, which is shown), and the rays 17 would be reversed instead of coming from the radiation source 31 to the point of exit from the emitter 24 (in the case of the emitter 11, which is shown), i.e., from the point of entrance into the sensor to the receiver (in the case of the sensor, which is not shown). The point of entrance into the sensor (in the case of the sensor, which is not shown) would then correspond to the point 24 of exit from the emitter 24.

Figure 5:
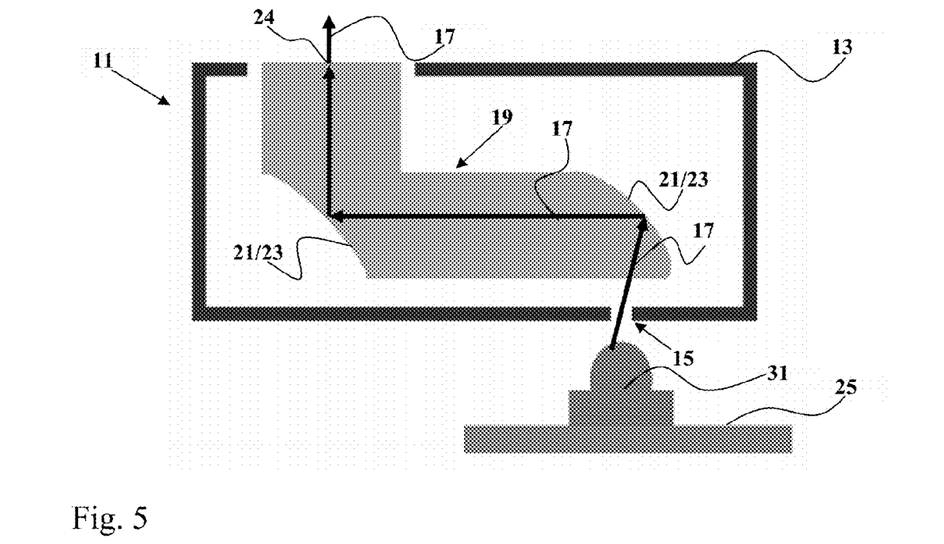
FIG. 5 a side view of a fourth embodiment variant of the device having a zigzag path of the rays, wherein the lens is replaced by two curved reflecting surfaces.

The emitters 11 shown in FIGS. 1, 2, 4, 5 and 7 and/or the combined emitter/sensor 11/12 shown in FIG. 8 each have a radiation source 31 (arranged on a circuit board 25), a housing 13, an aperture 15, a radiation-conducting device 19 having a plurality of radiation-conducting elements 21 (and/or 22 in FIG. 8) and one or more focusing elements 23, wherein the radiation-conducting elements 21 are focusing elements 23 at the same time in the case of the device according to FIG. 5. These are curved surfaces, which, on the one hand, reflect the rays 17 and, on the other hand, focus them. In the other embodiment variants according to FIGS. 1, 2, 4, 7 and 8, the focusing element 23 is arranged at the point 24 of exit of the rays 17 from the emitter 11 and is designed as a lens. It should be pointed out here that the focusing element 23 is also a radiation-conducting element and belongs to the radiation-conducting device 19. However, it has been assigned a separate reference numeral 23 to differentiate it from the other radiation-conducting elements 21.

The radiation source 31 is provided to emit electromagnetic radiation and/or electromagnetic rays 17, in particular in the form of light or infrared radiation. The radiation source 31 may be, for example, an LED, an infrared LED or a laser. (In the case of a sensor having a similar design (not shown) the radiation source would be replaced by a receiver, which might be a phototransistor, a light-sensitive resistor or a photodiode, for example.) The rays 17 emitted by the radiation source 31 are represented in simplified form as an arrow or a number of arrows indicating the path of the rays 17 in the examples shown here. For reasons of simplicity, not all arrows have been provided with reference numerals. In the exemplary embodiments shown here, the rays 17 go from the one or more radiation sources 31 through an optional aperture 15, which is formed by the housing 13 in the example shown here, to a radiation-conducting device 19, which conducts and deflects the rays 17 and thus defines the path of the rays from the respective radiation source 31 to the point 24 of exit of the rays from the emitter.

For this purpose, the radiation-conducting device 19 has a plurality of radiation-conducting elements 21, which in the present case are elements that reflect the rays 17 and additionally focus them in the case of the variant shown in FIG. 5. Another special radiation-conducting element 22 is shown in FIG. 8. It splits the rays 17 into two amounts of radiation, wherein one amount of radiation is reflected and the other amount of radiation passes through the radiation-conducting element 22.

In the embodiment variants shown in the drawings, several radiation-conducting elements 21, 22 are arranged in each case in such a way that the rays 17 pass through them in succession on their path from the radiation source 31 to the point 24 of exit from the emitter.

As shown in FIG. 7, a plurality of radiation sources 31 may also be provided with the emitter 11 (accordingly, it would also be conceivable to install a plurality of receivers in a sensor). In the example according to FIG. 7, the rays 17 are conducted in the form of separate amounts of radiation (cf. arrows), starting from the radiation sources 31 and over different radiation-conducting elements 21 in some segments and jointly after the amounts of radiation are combined, to a focusing element 23. The space in the emitter 11 can thus be utilized well and the efficiency of the emitter is also improved by the plurality of radiation sources 31.

Figure 1:
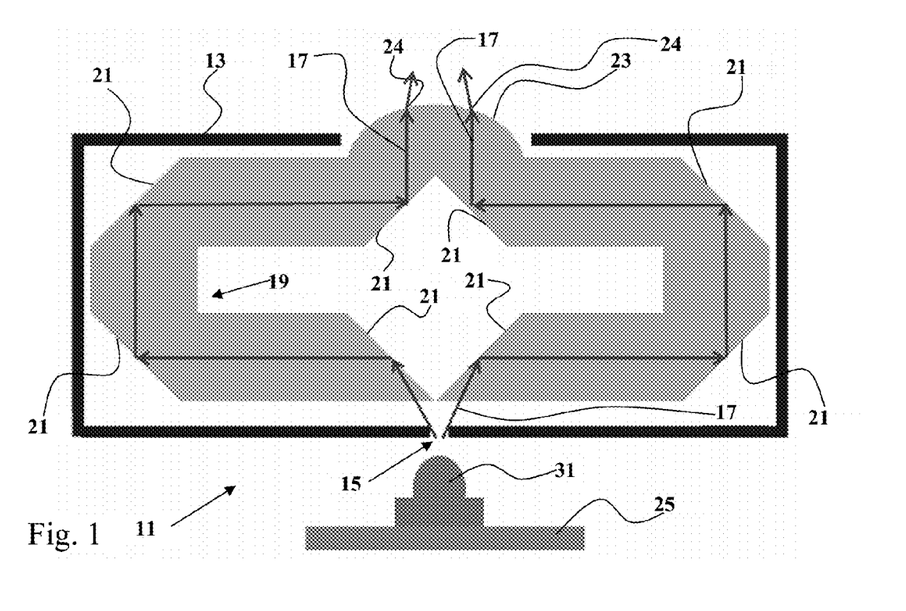
FIG. 1 a side view of a first embodiment variant of the device with splitting of the rays.

FIG. 1 shows a conceptually similar variant, in which the rays 17 passing through the aperture 15 are split into two amounts of radiation, wherein a first amount of radiation is conducted from the radiation source 31 to the point 24 of exit from the emitter by means of first radiation-conducting elements 21 of the radiation-conducting device 19, and a second amount of radiation is conducted by means of second radiation-conducting elements 21. It would of course also be possible to split the rays into 3, 4 or more amounts of radiation and to conduct and/or deflect these amounts of radiation on the path from the radiation source to the points 24 of exit from the emitter by means of different radiation-conducting elements.

Since the rays emitted by the radiation source have scattering, it is possible, due to the split into a plurality of amounts of radiation, to use radiation-conducting elements that are designed for conducting and/or deflecting amounts of radiation, but would be too small for conducting and/or deflecting the totality of rays, instead of using radiation-conducting elements that are designed for conducting and/or deflecting the totality of the rays emitted by the radiation source. Thus instead of a small number of larger radiation-conducting elements, a plurality of smaller radiation-conducting elements that can be positioned flexibly are used.

Figure 6:
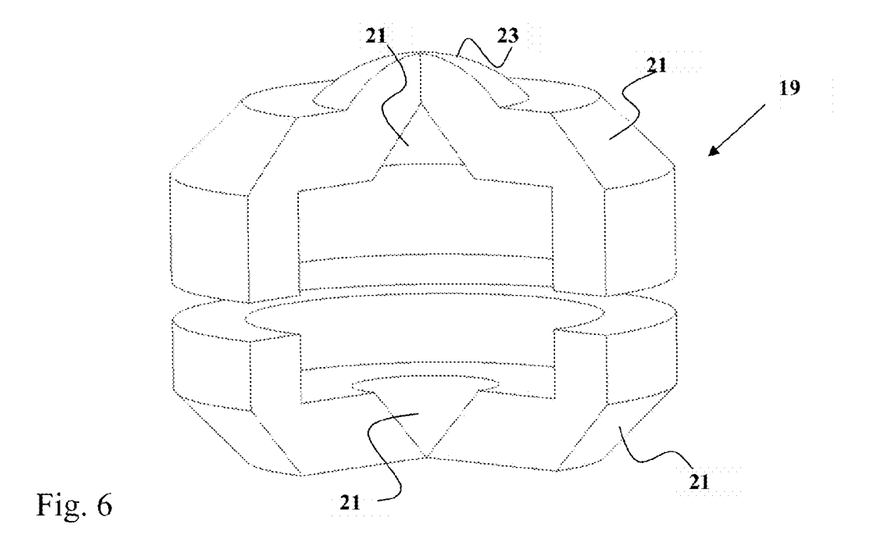
FIG. 6 a perspective view (as a section) of a radiation-conducting arrangement of rotational bodies with an integrated focusing element.

An even greater splitting of the rays 17 can be achieved with a radiation-conducting device 19, such as that shown in FIG. 6. What is special about this is its design as a rotational body. In the example shown here, the first radiation-conducting element (21 at the bottom) struck by the rays on their path from the radiation source to the point of exit from the emitter, is therefore essentially in the form of a cone or truncated cone. Since the surface of the radiation-conducting element 21 in the form of a cone or truncated cone would expediently be curved in the direction from the base to the tip in practice (i.e., it is not straight in longitudinal section, as will be the case with a cone or truncated cone), in more general terms, it can also be stated that the aforementioned radiation-conducting element 21 is a rotational body that tapers and/or forms a point. Due to the radiation-conducting element 21, the rays are reflected and are thus conducted essentially radially outward. Next, they are reflected by additional radiation-conducting elements (21 at the side), which are essentially in the form of a truncated cone (or more generally: designed as tapering rotational bodies) and thus are deflected until they again strike a radiation-conducting element (21 at the top) that is essentially in the form of cone or a truncated cone. The latter case may also involve a rotational body that tapers and/or forms a point, to put it in more general terms. The rays are combined there and then conducted essentially in the same direction. Next, they can optionally be focused by a focusing element 23. However, a radiation-conducting device 19 might also have, instead of a rotational symmetry, 1, 2, 3, 4 or more axes of symmetry. For example, it may have a square, rectangular or polygonal cross section, in particular usually polygonal. In this case, there would be the option to design the first radiation-conducting element described here and also a radiation-conducting element that is optionally also described and by means of which the rays are combined, to be essentially in the shape of a pyramid, for example. In the section, the variants described in conjunction with FIG. 6 may look like those shown in FIG. 1. Again in this example, the amounts of radiation are combined before reaching the point 24 of exit from the emitter 11, and from this point on they are conducted jointly through the radiation-conducting device 19 to the point 24 of exit from the emitter.

The focusing element 23 is advantageously located at the point 24 of exit from the emitter—as shown in FIGS. 1, 2, 4, 7 and 8. However, this is not obligatory. There is also the possibility of providing a plurality of focusing elements 23, which may be arranged in such a way that, for example, the rays 17 pass through these focusing elements in succession on their path from the radiation source 31 to the point 24 of exit—as shown in FIG. 5, for example. Alternatively or additionally, the focusing elements 23 may be designed so that each one focuses a portion of the rays (amount of radiation) when the latter are split as shown in FIG. 1, for example.

The radiation-conducting device 19 allows the rays 17 to diverge and/or to move a distance apart from one another on the path from the radiation source 31 to the focusing element 23. As shown in FIGS. 1, 2, 4, 7 and 9, for example, this is achieved by the fact that the radiation-conducting device 19 deflects the rays 17 repeatedly, in particular reflecting them and thus conducting them in different directions (e.g., 2, 3, 4 or more) in succession before they reach the point 24 of exit from the emitter.

The radiation-conducting device 19 may each be designed to conduct and/or deflect the rays 17 in one or successively in a plurality of directions (e.g., 2, 3, 4 or more), which are aligned transversely (e.g., at an angle of at least 10°, 20°, 30° or 60°) to a direct connection between the radiation source 31 and the point 24 of exit from the emitter, as also shown in FIGS. 1, 2, 4, 5, 7 and 8, for example.

Figure 2:
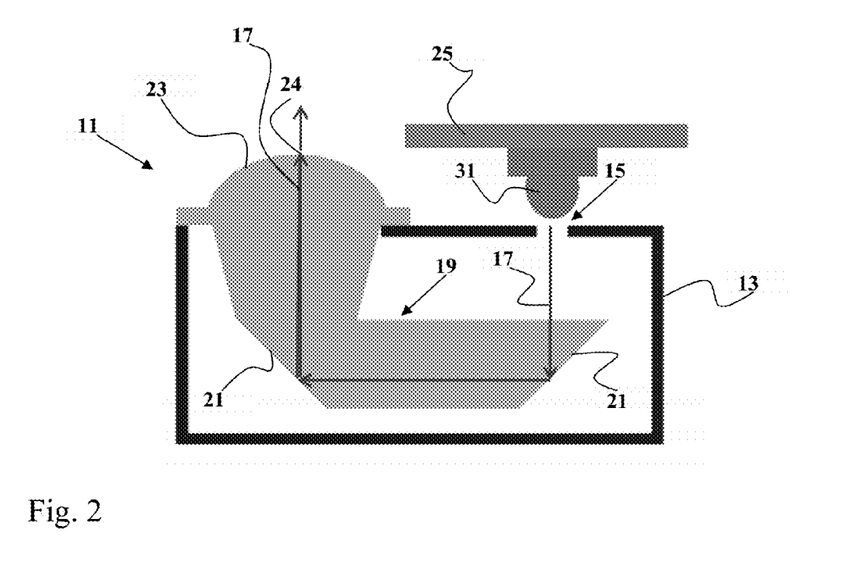
FIG. 2 a side view of a second embodiment variant of the device with a U-shaped path of the rays.
Figure 3:
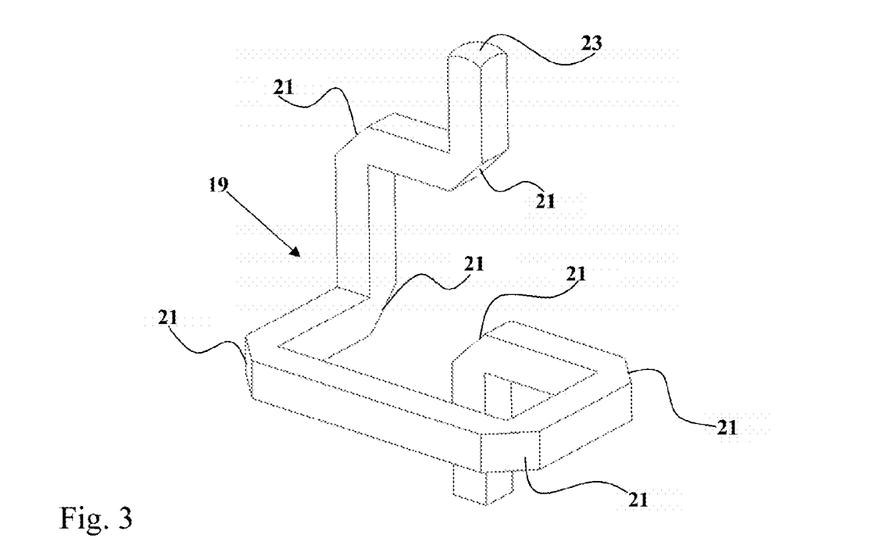
FIG. 3 a perspective view of a radiation-conducting arrangement, which defines an essentially helical path of the rays over a segment.
Figure 4:
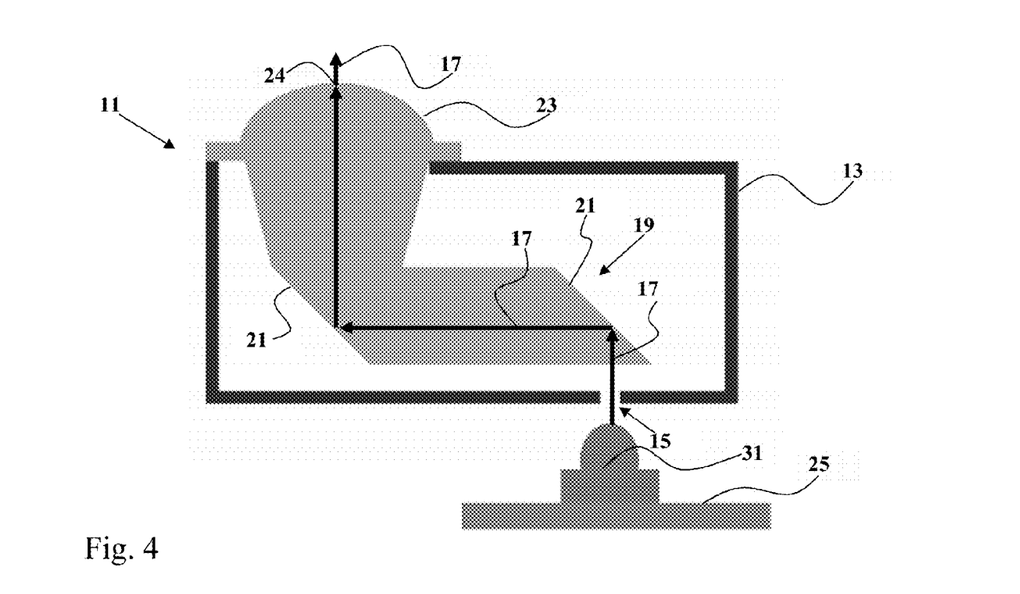
FIG. 4 a side view of a third embodiment variant of the device having a zigzag-shaped ray path.

It is advantageous in particular if the rays 17 are conducted once or more each back and forth on the path from the radiation source 31 to the point 24 of exit from the emitter, so that the rays 17 are each returned over a segment of path that they have traveled in one direction. Such a variant is illustrated in FIGS. 1 and 2, for example, and would also be achievable by a radiation-conducting arrangement according to FIG. 3.

An additional possibility of lengthening the path from the radiation source 31 to the point 24 of exit from the emitter consists of conducting and/or deflecting the rays 17 in at least three directions, which do not lie in a common plane, by means of the radiation-conducting arrangement 23. A radiation-conducting arrangement, such as that shown as an example in FIG. 3, would accomplish this. Therefore, all three space dimensions are utilized.

Another possibility for lengthening the path between the radiation source 31 and the point 24 of the exit is to design the radiation-conducting arrangement 23 to conduct and/or deflect the rays on the path from the radiation source to the point of exit from the emitter one after the other in several directions, forming a repetitive pattern, in which one or more of these directions are repeated at least 2, 3 or 4 times. In this way, the radiation-conducting device 19 may define essentially a spiral (cf. FIG. 3, for example), helical, S-shaped or zigzag path for the rays 17.

As depicted in FIGS. 1 through 8, the entire radiation-conducting device 19 (FIGS. 1 to 5 and 7 to 8) or two or more radiation-conducting elements 21 (FIG. 6) may be designed in one piece, optionally also including one or more focusing elements 23. Such parts can be produced inexpensively by injection molding, for example.

It can be seen in FIG. 2 that the radiation source 31 may be arranged in any position relative to the point 24 of exit from the emitter. The radiation source 31 and the focusing element 23 may be arranged on the same side of the emitter 11 or the housing 13, for example, as shown in FIG. 2, or they may be arranged on different sides, in particular opposite sides of the emitter 11 or the housing 13, as shown in FIGS. 1, 4, 5, 7 and 8. If several radiation sources 31 are provided, they may also be arranged on the same side or on different sides of the emitter 11 or the housing.

In the variant according to FIG. 8, which involves a light sensor, the emitter 11 and the sensor 12 are combined in one unit. They are designed as a device 11, 12 and advantageously have a common housing 13, as shown here. The rays (solid arrows) emitted by the radiation source 31 are reflected on a radiation-conducting element 22 along their path to the point 24 of exit from the device 11, 12. After their exit from the device 11, 12, they strike an object 10 and are partially reflected by it. The reflected rays (dotted-line arrows) enter at the point 26 of entrance into the device 11, 12 and strike the aforementioned radiation-conducting element 22 on their path away from the aforementioned point 26 to the receiver 41, then pass through the aforementioned radiation-conducting element, arriving at the receiver 41 where they are detected.

It is also possible in principle to use a radiation-conducting element 22 for the construction of an emitter. This radiation-conducting element is shown in FIG. 8, reflecting some of the incident radiation and allowing some of it to pass through (cf. discussion of the radiation-conducting element 22 and FIG. 8 further above). The aforementioned radiation-conducting element may be used to split the rays 17 into two amounts of radiation, wherein these amounts of radiation can then be conducted further, as described above, for the different amounts of radiation, for example.

The invention claimed is:

1. A device for detecting objects in a monitoring area, comprising;
    an emitter comprising a radiation source capable of emitting electromagnetic rays and a radiation-conducting device operably coupled to the radiation source and configured to conduct the electromagnetic rays along at least one path from the emitter to a point of exit of the radiation-conducting device, wherein the radiation-conducting device has a focusing element at the point of exit to focus the electromagnetic rays that exit the radiation-conducting device, the radiation-conducting device comprising a plurality of reflective surfaces to reflect the electromagnetic rays at least twice on the at least one path from the radiation source to the point of exit; and
    an electromagnetic ray sensor separate from the emitter and operably spaced from the radiation-conducting device to define an object monitoring area in a direct line between the point of exit of the radiation conducting device and the electromagnetic ray sensor, the electromagnetic ray sensor comprising a receiver for receiving the electromagnetic rays that exit the point of exit of the radiation-conducting device, which may be affected by an object in the object monitoring area, and are received by the sensor.

2. The device of claim 1, wherein the at least one path of the electromagnetic rays, from the radiation source to the point of exit, are defined by the radiation-conducting device, which comprises essentially an S-shape or a zigzag-shape in at least some segments thereof.

3. The device of claim 2, wherein at least a part of the radiation-conducting device that is configured to reflect the rays on the at least one path from the radiation source to the point of exit by the plurality of reflections, comprises the focusing element.

4. The device of claim 2, wherein at least a part of the radiation-conducting device that is configured to reflect the rays on the at least one path from the radiation source to the point of exit from the emitter by the plurality of reflections is formed from one piece.

5. The device of claim 2, wherein at least a part of the radiation-conducting device that is configured to reflect the rays on the at least one path from the radiation source to the point of exit by the plurality of reflections is formed by injection-molding.

6. The device of claim 1, wherein the radiation-conducting device comprises a plurality of radiation-conducting elements.

7. The device of claim 6, wherein the radiation-conducting device is configured to conduct the rays on the at least one path to the point of exit in the form of a plurality of individual amounts of radiation and to conduct the plurality of individual amounts of radiation separately from one another in at least some segments of different radiation-conducting elements to the point of exit.

8. The device of claim 6, wherein the radiation-conducting device is configured to split the electromagnetic rays into a plurality of amounts of radiation on the at least one path from the radiation source to the point of exit and to conduct each of the plurality of amounts of radiation from a point of splitting in at least some segments of different radiation-conducting elements to the point of exit.

9. The device of claim 6, wherein the plurality of radiation-conducting elements have a progressively increasing size in which the electromagnetic rays strike them or pass through them on the at least one path from the radiation source to the point of exit.

10. The device of claim 6, wherein the emitter comprises one or more additional radiation sources for emission of additional electromagnetic rays in addition to the electromagnetic rays from the radiation source and wherein the radiation-conducting device is configured to conduct the additional electromagnetic rays on the at least one path from the one or more additional radiation sources to the point of exit.

11. The device of claim 6, wherein one radiation-conducting element of the plurality of radiation-conducting elements is configured to reflect some of the electromagnetic rays striking the one radiation-conducting element of the plurality of radiation-conducting elements and to allow the rest of the electromagnetic rays to pass through.

12. A method for detecting objects in a monitoring area, comprising:
using a device for detecting at least one object in a monitoring area, the device comprising;
an emitter comprising a radiation source capable of emitting electromagnetic rays and a radiation-conducting device operably coupled to the radiation source and configured to conduct the electromagnetic rays along at least one path from the emitter to a point of exit of the radiation-conducting device, wherein the radiation-conducting device has a focusing element at the point of exit for focusing the electromagnetic rays that exit the radiation-conducting device, the radiation-conducting device comprising a plurality of reflective surfaces to reflect the electromagnetic rays at least twice on the at least one path from the radiation source to the point of exit; and
an electromagnetic ray sensor operably spaced from the point of exit of the radiation-conducting device to define an object monitoring area in a direct line between the point of exit of the radiation-conducting device and the electromagnetic ray sensor, the electromagnetic ray sensor comprising a receiver for receiving the electromagnetic rays that exit the point of exit of the radiation-conducting device, which may be affected by an object in the object monitoring area, and are received by the electromagnetic sensor.

13. The method of claim 12, further comprising using the device wherein the at least one path of the electromagnetic rays, from the radiation source to the point of exit, are defined by the radiation-conducting device, which comprises essentially an S-shape or a zigzag-shape in at least some segments thereof.

14. The method of claim 13, further comprising using the device wherein at least a part of the radiation-conducting device that is configured to reflect the rays on the at least one path from the radiation source to the point of exit by the plurality of reflections, comprises the focusing element.

15. The method of claim 13, further comprising using the device wherein at least a part of the radiation-conducting device that is configured to reflect the rays on the at least one path from the radiation source to the point of exit by the plurality of reflections is formed from one piece.

16. The method of claim 13, further comprising using the device wherein at least a part of the radiation-conducting device that is configured to reflect the rays on the at least one path from the radiation source to the point of exit by the plurality of reflections is formed by injection-molding.

17. The method of claim 12, further comprising using the device wherein the radiation-conducting device comprises a plurality of radiation-conducting elements.

18. The method of claim 17, further comprising using the device wherein the radiation-conducting device is configured to conduct the rays on the at least one path to the point of exit in the form of a plurality of individual amounts of radiation and to conduct the plurality of individual amounts of radiation separately from one another in at least some segments of different radiation-conducting elements to the point of exit.

19. The method of claim 17, further comprising using the device wherein the radiation-conducting device is configured to split the electromagnetic rays into a plurality of amounts of radiation on the at least one path from the radiation source to the point of exit and to conduct the individual amounts of radiation from a point of splitting in at least some segments of different radiation-conducting elements to the point of exit.

20. The method of claim 17, further comprising using the device wherein the plurality of radiation-conducting elements have a progressively increasing size in which the electromagnetic rays strike them or pass through them on the at least one path from the radiation source to the point of exit.

21. The method of claim 17, wherein the emitter has one or more additional radiation sources for emission of additional electromagnetic rays in addition to the electromagnetic rays from the radiation source and wherein the radiation-conducting device is configured to conduct the additional electromagnetic rays on the at least one path from the one or more additional radiation sources to the point of exit.

22. The method of claim 17, further comprising using the device wherein one radiation-conducting element of the plurality of radiation-conducting elements is configured to reflect some of the electromagnetic rays striking the one radiation-conducting element of the plurality of radiation-conducting elements and to allow the rest of the electromagnetic rays to pass through.

23. A device for detecting objects in a monitoring area, comprising;
- an emitter comprising a radiation source capable of emitting electromagnetic rays;
- a sensor comprising a receiver for receiving the electromagnetic rays from the emitter; and
- a radiation-conducting device operably coupled to the receiver and configured to conduct the electromagnetic rays along at least one path from a point of entrance of the radiation-conducting device to the receiver of the sensor, the radiation-conducting device comprising a plurality of reflective surfaces to reflect the electromagnetic rays at least twice on the at least one path from the point of entrance to the receiver, the point of entrance of the radiation-conducting device operably spaced from the emitter to define an object monitoring area in a direct line between the point of entrance and the emitter, wherein the sensor receives the electromagnetic rays from the emitter, which may be affected by at least one object within the object monitoring area.

24. The device of claim 23, wherein the at least one path of the electromagnetic rays, from the radiation source to the receiver, are defined by the radiation-conducting device, which is configured to be essentially an S-shape or a zigzag-shape in at least some segments thereof.

25. The device of claim 23, wherein at least a part of the radiation-conducting device that is configured to reflect the rays on the at least one path from the radiation source to the receiver by the plurality of reflections, comprises a focusing element.

26. The device of claim 23, wherein at least a part of the radiation-conducting device that is configured to reflect the rays on the at least one path from the radiation source to the receiver by the plurality of reflections is formed from one piece.

27. The device of claim 23, wherein the radiation-conducting device is configured to split the electromagnetic rays into a plurality of amounts of radiation on the at least one path from the radiation source to the receiver and to conduct the individual amounts of radiation from a point of splitting in at least some segments of different radiation-conducting elements to the receiver.

28. The device of claim 23, wherein the radiation-conducting device comprises a plurality of radiation-conducting elements having a progressively increasing size in which the electromagnetic rays strike them or pass through them on the at least one path from the radiation source to the receiver.

29. The device of claim 28, wherein one radiation-conducting element of the plurality of radiation-conducting elements is configured to reflect some of the electromagnetic rays striking the one radiation-conducting element of the plurality of radiation-conducting elements and to allow the rest of the electromagnetic rays to pass through.

* * * * *